(12) United States Patent
Gurtowski et al.

(10) Patent No.: US 11,000,826 B2
(45) Date of Patent: May 11, 2021

(54) IN SITU TESTING APPARATUS FOR DETECTING AND REMOVING MUNITIONS COMPOUNDS FROM WATER

(71) Applicant: United States of America as Represented by The Secretary of The Army, Alexandria, VA (US)

(72) Inventors: Luke A Gurtowski, Vicksburg, MS (US); Manoj K Shukla, Clinton, MS (US); David P Martin, Clinton, MS (US); Christopher S Griggs, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 413 days.

(21) Appl. No.: 16/144,998

(22) Filed: Sep. 27, 2018

(65) Prior Publication Data

US 2019/0118162 A1    Apr. 25, 2019

Related U.S. Application Data

(60) Provisional application No. 62/574,691, filed on Oct. 19, 2017.

(51) Int. Cl.
*B01J 20/24* (2006.01)
*B01J 20/28* (2006.01)
*B01J 20/30* (2006.01)
*C02F 1/28* (2006.01)
*B01J 20/34* (2006.01)
*C02F 101/00* (2006.01)
*C02F 103/00* (2006.01)

(52) U.S. Cl.
CPC ......... *B01J 20/24* (2013.01); *B01J 20/28085* (2013.01); *B01J 20/3085* (2013.01); *C02F 1/286* (2013.01); *B01J 20/3425* (2013.01); *B01J 2220/4831* (2013.01); *C02F 2101/003* (2013.01); *C02F 2103/007* (2013.01)

(58) Field of Classification Search
CPC .. B01J 20/24; B01J 20/28085; B01J 20/3085; B01J 20/3425; B01J 2220/4831; C02F 1/286; C02F 2101/003; C02F 2103/007
USPC ........................................................ 502/404
See application file for complete search history.

(56) References Cited

U.S. PATENT DOCUMENTS 3,635,818 A    1/1972  Muzzarelli

*Primary Examiner* — Edward M Johnson
(74) *Attorney, Agent, or Firm* — Brian C. Jones

(57) ABSTRACT

The invention is a renewable adsorbent material, amine-functionalized chitin (AFC) that can remove the following munitions compounds from solution while providing a concentration-dependent color change: NTO, DNAN, and TNT. Adsorption of the munitions constituents can be adjusted by pH; neutral pH provides maximum adsorption. NTO can desorb from the AFC at pH levels of 2 and 12; DNAN and TNT remain attached to AFC once adsorbed.

20 Claims, 5 Drawing Sheets

IN SITU TESTING APPARATUS FOR DETECTING AND REMOVING MUNITIONS COMPOUNDS FROM WATER

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of renewable adsorbent material, and more specifically to an amine-functionalized chitin (AFC) that can remove munitions compounds from solution.

BACKGROUND OF THE INVENTION

The contamination of soil water from testing and disposal of munitions is a global concern. Common munitions (explosive) compounds such as Nitrotriazolone (NTO), 2,4-dinitroanisole (DNAN), and trinitrotoluene (TNT) can contaminate soil and groundwater are toxic, both acute and chronically. Munitions compounds are resistant to natural microbiological degradation. Even low levels can cause severe effects to an eco-system.

The Department of Defense (DoD) has estimated that, in the U.S. alone, munitions contaminated 15 million acres of land with clean-up costs ranging from $3-$35 billion.

Naturally occurring chitins have been successfully used to remove metal contaminants from water. However, the primary ingredient in common munitions compounds is nitrogen rather than metal. There are no naturally occurring chitins which bind to nitrogen and extract munitions contaminants at a high enough rate for effective remediation.

There is an unmet need for substances which can be produced in abundant supply to remove munitions compounds from underground water supplies, lakes, rivers and tributaries and oceans on global scale.

SUMMARY OF THE INVENTION

A munitions compound detection and removal apparatus with a delivery component that allows a quantity of amine functionalized chitin (AFC) compound to interface with a water sample or slurry of water mixed with a solid such as soil. The AFC compound is a chitin molecule bound to amine groups, which can change color in the presence of a munitions compound. The delivery component also has a viewable interface that displays a color correlated with the presence of a munitions compound.

BRIEF DESCRIPTION OF SEVERAL VIEWS OF THE DRAWING(S)

TERMS OF ART

As used herein, the term "2,4-dinitroanisole" (DNAN) means a munitions compound with the chemical structure of an anisole (methoxybenzene) core, with two nitro groups (—NO2) attached.

As used herein, the term "amine functionalized chitin compound" ("AFC" compound) means a chitin molecule chain with N-acetylglucosamine units wherein each N-acetylglucosamine unit may have an amine group bound to it.

As used herein, the term "infused" means containing AFC material that is affixed to, embedded within, woven into, or filling the object.

As used herein, the term "nitrotriazolone" (NTO) means a munitions compound with the chemical structure $C_2H_2N_4O_3$.

As used herein, the term "delivery component" means a material or container that brings AFC material into contact with a water sample or a slurry of water mixed with a solid such as soil.

As used herein, the term "trinitrotoluene" (TNT) means a munitions compound with the chemical formula $C_6H_2(NO_2)_3CH_3$.

As used herein, the term "viewable interface" means an unobstructed surface of an object or transparent covering that allows an object to be seen.

DETAILED DESCRIPTION OF THE INVENTION

Figure 1:
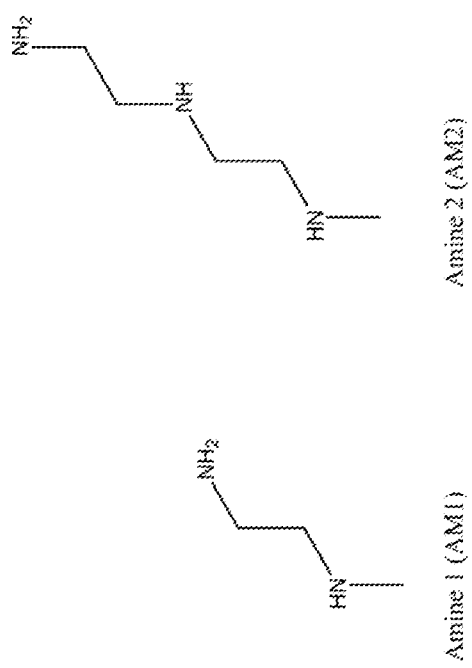
FIG. 1 illustrates chemical structures for amine functional groups AM1 and AM2 (prior art).

FIG. 1 illustrates chemical structures for amine functional groups AM1 and AM2 (prior art).

FIG. 1 illustrates two amine functional groups. AM1 is a chain with the following order of atoms: nitrogen, carbon, carbon, and nitrogen. AM2 is a chain with the following order of atoms: nitrogen, carbon, carbon, nitrogen, carbon, carbon, and nitrogen. Either amine functional group AM1 or AM2 may be attached to chitin to create Amine Functionalized Chitin (AFC) material.

Figure 2:
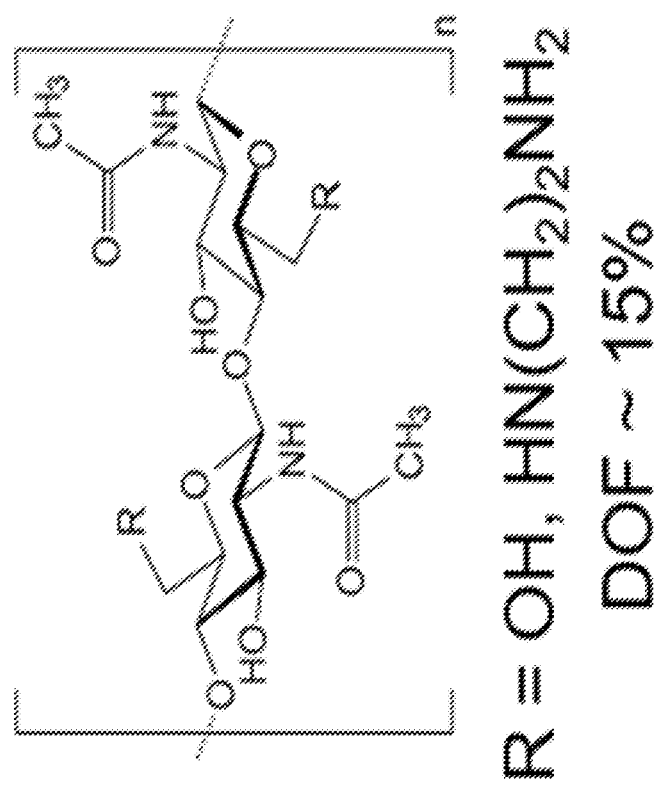
FIG. 2 illustrates an exemplary embodiment of the chemical structure for Amine-Functionalized Chitin ("AFC") material.

FIG. 2 illustrates an exemplary embodiment of the chemical structure for Amine-Functionalized Chitin ("AFC") material.

The exemplary embodiment of AFC material shown is produced from chitin. Chitin is the world's second most abundant biopolymer, making it a renewable resource. Therefore, AFC material is a sustainable technology because its main ingredient is in high supply.

Chitin has the chemical formula $C_{16}H_{28}N_2O_{11}$ $(C_8H_{13}NO_5)_n$, with n number of N-acetylglucosamine units. In the exemplary embodiment shown, an amine group with the following order of atoms: nitrogen, carbon, carbon, and nitrogen may be bound to each N-acetylglucosamine unit in the chitin chain (represented in FIG. 2 as functional group R). The molecule has a degree of freedom measurement of approximately 15%. In various embodiments, alternative amine groups may be bound to each N-acetylglucosamine unit in the chitin chain.

The exemplary embodiment of AFC material shown detects munitions compounds in water, including Nitrotriazolone (NTO), 2,4-dinitroanisole (DNAN), and trinitrotoluene (TNT). AFC material may be used as a renewable adsorbent for traditional and insensitive munition (IM) compounds. Compared to traditional munition compounds, insensitive munition compounds resist exploding when exposed to heat, shock, or the explosions of nearby munition.

In the exemplary embodiment shown, AFC in solid powder form displays a tan hue before operation. For the exemplary embodiment shown, when AFC is exposed to NTO, DNAN, or TNT in solution, the material immediately begins to change color. A steady-state (final) color is reached by 24 hours of exposure, according to preliminary lab evaluations; however, this color is likely reached within a much shorter time span. In various embodiments, AFC material will also react in the presence of a slurry made of munitions compound-contaminated soil mixed with water.

Regardless, each contaminant causes a distinct color change to AFC, allowing for the detection of the specific component. When exposed to NTO, this exemplary embodiment of AFC changes to light yellow. When exposed to DNAN, this exemplary embodiment of AFC changes to yellow. When exposed to TNT, this exemplary embodiment of AFC changes to a pink color. The intensity of this color depends upon the concentration of the contaminant within solution to which AFC is exposed. Therefore, expedient quantification of the contaminants is expected using this technology.

AFC material may be used as a renewable adsorbent for insensitive munition (IM) compounds. Based upon its pH dependence, it may be used as a regenerative adsorbent. Additionally, the material may be used for the purification of IMs including but not limited to NTO, DNAN, or TNT. The color change associated with the adsorption could be used for detection and colorimetric detection of IM compounds. This adsorbent material could potentially provide these benefits relative to other military materials, as well.

This material could be used as a renewable adsorbent for non-military contaminants. Based on its pH dependence, this material could be used as an easily regenerative absorbent for certain compounds. The selectivity of this adsorbent could provide purification of certain industrial waste streams. The color change associated with adsorbent could be used in sensing and quantification applications.

Additional advantages to using AFC material include increased sustainability of water treatment technology, and improved cost efficiency of water treatment for insensitive munition (IM) compounds. Using AFC material also provides colorimetric detection of traditional and insensitive munitions compounds when used as a sensing application, clear detection of munitions constituents, and expedited quantification of munitions constituents.

AFC material is also useful for sustainable removal of traditional and insensitive munition compounds from solution via adsorption, effective separation and purification of IM compounds, regenerative adsorption of insensitive munition compounds via pH adjustment, separation and purification of insensitive munition compounds via selective adsorption. Other potential contaminants could be removed from solution, detected, or quantified using this technology.

When AFC is added to solutions containing NTO, DNAN, and TNT, it removes these contaminants from solution via adsorption. This removal is pH-dependent, however, and is maximized at neutral pH levels. The pH dependence provides an additional benefit in that NTO can be desorbed at certain pH levels. This feature regenerates the adsorbent and extends its life. Additionally, NTO can be separated and purified from the other components.

Lastly, certain munition compounds, including nitroguandine (NQ) are impervious to various exemplary embodiments of AFC material. AFC material can selectively adsorb energetic compounds. This selective adsorption provides further separation and purification of the material. This property has not been observed for other commonly used adsorbents.

Figure 3:
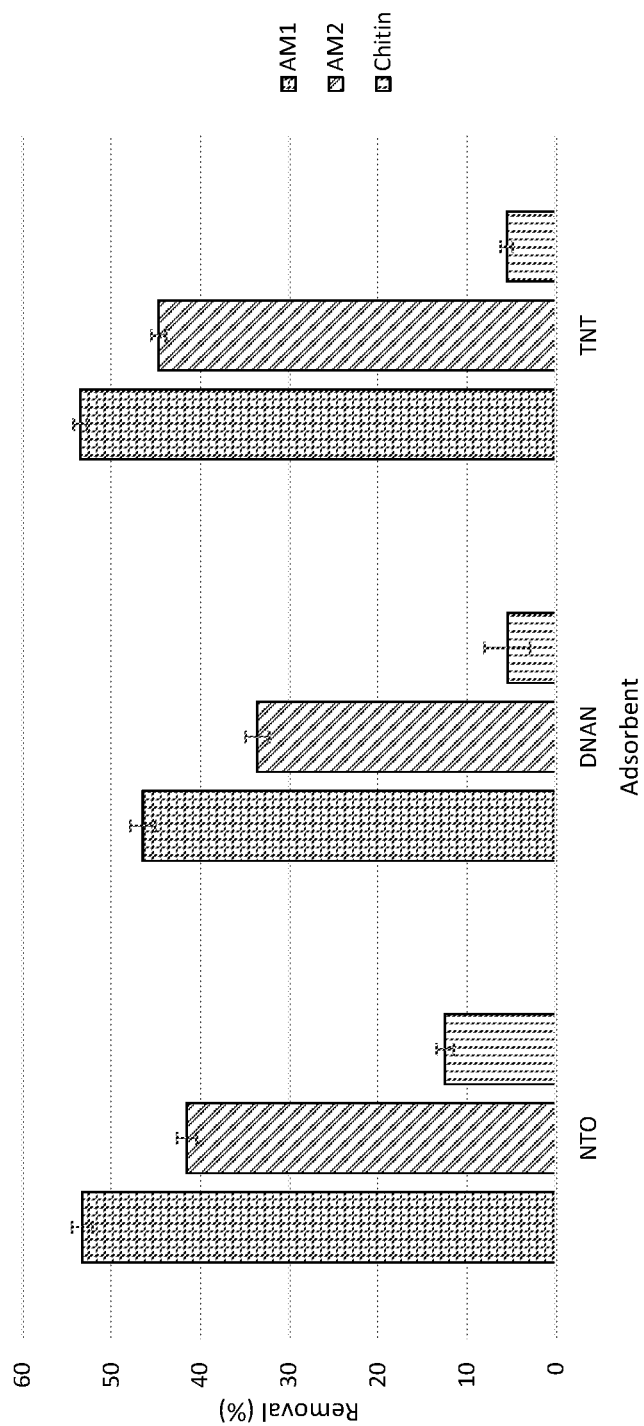
FIG. 3 illustrates exemplary removal percentages of NTO, DNAN, and TNT from solution by two embodiments of AFC material.

FIG. 3 illustrates exemplary removal percentages of NTO, DNAN, and TNT from solution by two embodiments of AFC material.

In this exemplary embodiment, AFC material (in a quantity of 100 grams) extracted nitrotriazolone (NTO), 2,4-dinitroanisole (DNAN), or trinitrotoluene (TNT) individually from three separate solutions with a volume of 10 mL and a concentration of 10 mg/L. The AFC experienced color changes related to the munitions compound to which it was exposed. NTO, DNAN, and TNT provided light yellow, dark yellow, and pink hues, respectively (not shown).

Quantitative analysis via High Performance Liquid Chromatography (HPLC) showed that AFC functionalized with amine group 1 (AM1, depicted in FIG. 1) removed approximately 50% of each munitions constituent from solution after 24 hours of exposure. The AFC functionalized with amine group 2 (AM2, depicted in FIG. 1) removed approximately 40% of each munitions constituent from solution after 24 hours of exposure.

Plain chitin extracted between 5% and 12% of the munitions compounds from solution.

Figure 4:
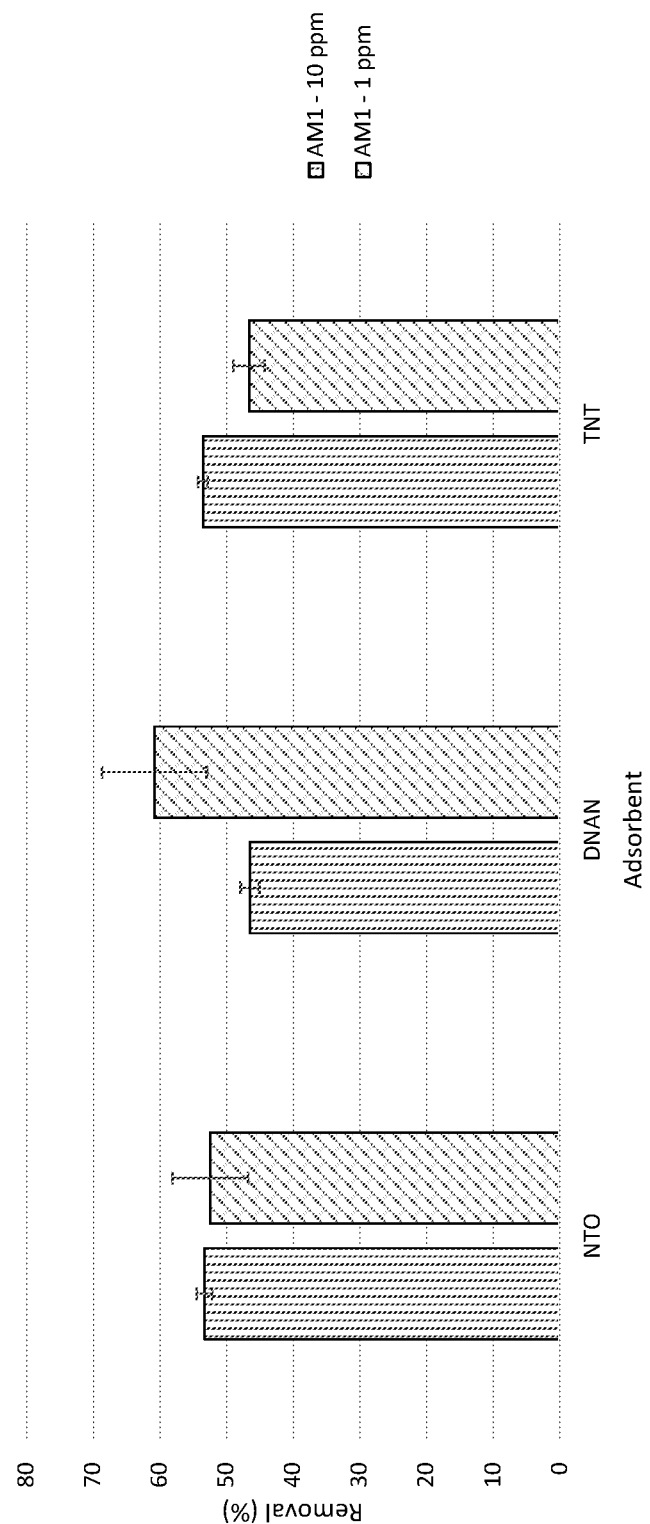
FIG. 4 illustrates exemplary removal percentages of varying concentrations of NTO, DNAN, and TNT by AFC material.

FIG. 4 illustrates exemplary removal percentages of varying concentrations of NTO, DNAN, and TNT by AFC material.

The AFC material (in a quantity of 100 grams) extracted nitrotriazolone (NTO), 2,4-dinitroanisole (DNAN), or trinitrotoluene (TNT) individually from three separate solutions with a volume of 10 mL and a concentration of either 10 mg/L (10 ppm) or 1 mg/L (1 ppm). Quantitative analysis via High Performance Liquid Chromatography (HPLC) showed that AFC functionalized with amine group 1 (AM1, depicted in FIG. 1) removed approximately 50% of each munitions constituent from each munition solution after 24 hours of exposure, at both concentrations.

When 100 grams of AFC encountered 1 mg/L concentrations of munitions solutions, the color changes were less intense than when AFC encountered 10 mg/L solutions (not shown). When 100 grams of AFC encountered 50 mg/L concentrations of munitions solutions in 18.2 MΩ water, the color changes were more intense than when AFC encountered 10 mg/L solutions (not shown). These data indicate a dependence of the color intensity on the concentration of the munition compound in solution, providing a potential for not only detection but also quantification.

Figure 5:
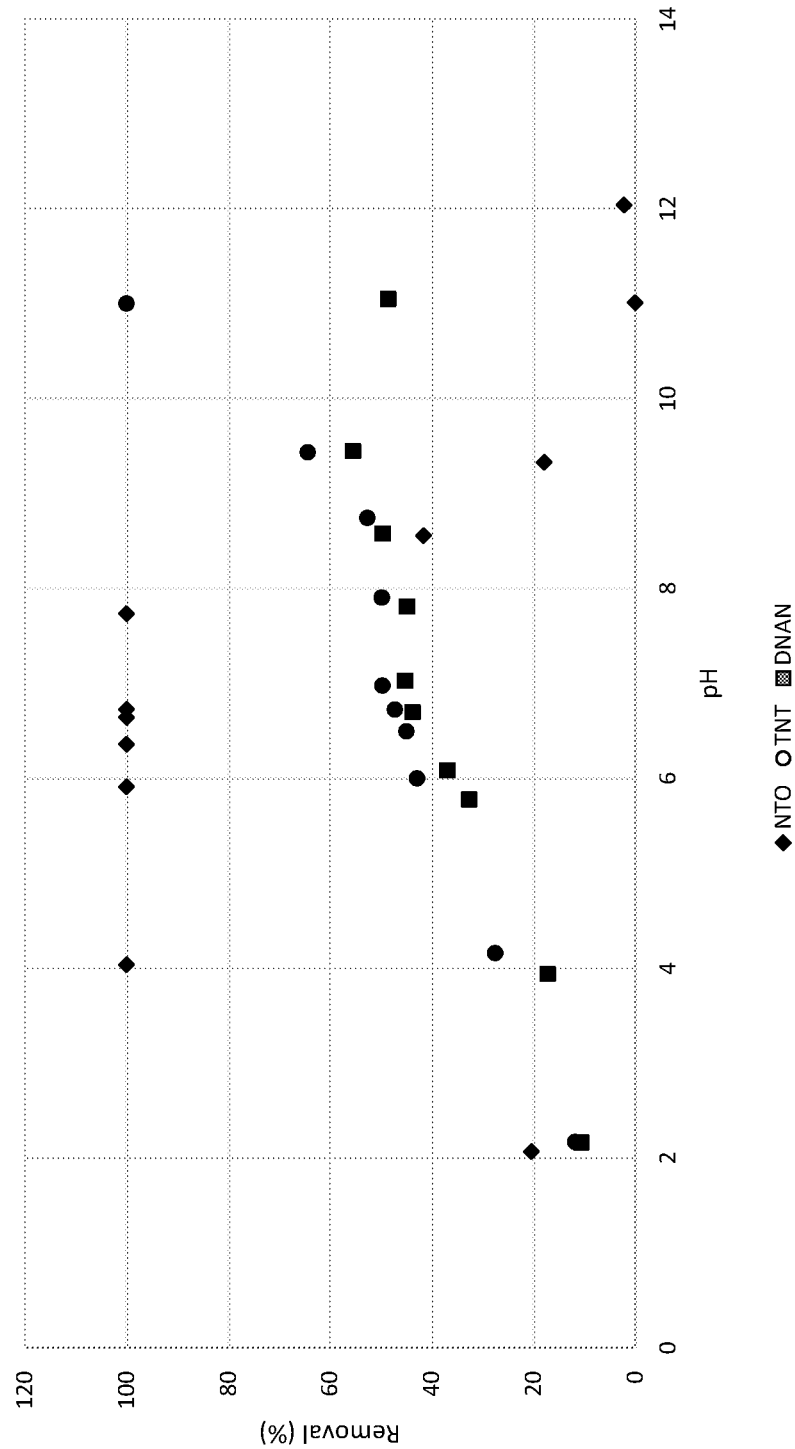
FIG. 5 illustrates exemplary effects of pH level on the removal percentages of NTO, DNAN, and TNT by AFC material.

FIG. 5 illustrates exemplary effects of pH level on the removal percentages of NTO, DNAN, and TNT by AFC material.

The AFC material (in a quantity of 100 grams) extracted nitrotriazolone (NTO), 2,4-dinitroanisole (DNAN), or trinitrotoluene (TNT) individually from solutions with a volume of 10 mL, a concentration of 1 mg/L (1 ppm), and one of eleven pH levels between 2 and 12. Additional AFC functionalized with AM1 was produced. Sodium hydroxide (NaOH) and hydrochloric acid (HCl) controlled pH levels. The greatest adsorption and removal of munitions compounds occurs at a neutral pH; alkaline hydrolysis of TNT and DNAN occurs at high pH and skews the data.

Further experimentation showed that when the pH was lowered to 2 after adsorption at a neutral pH occurred, 67% of the NTO desorbed into solution. However, DNAN and TNT did not desorb at this pH. The experiment was repeated for NTO such that the pH was raised to 12 after adsorption at a neutral pH, and 77% of the NTO was desorbed. This experiment was not conducted for DNAN and TNT because alkaline hydrolysis would skew the results.

Therefore, these results show than AFC can be regenerated by change in pH of the feed solution. NTO, specifically, can be desorbed into solution when the pH is lowered to 2 or raised to 12. This feature extends the life of the adsorbent and, because DNAN and TNT are not desorbed, further provides separation and purification of munitions constituents. This property has not been observed for other commonly used adsorbents.

In one exemplary embodiment, synthesis of AFC material uses chitin and an amine-bearing organic material. First, the synthesis method adds tosyl groups to chitin molecules. Then, an amine functional group replaces the tosyl group to create AFC material. "R" represents any amine group, but in the exemplary embodiment shown, it represents the amine group AM1 as depicted in FIG. 1, having a chain of atoms in the sequence nitrogen, carbon, carbon, nitrogen. In the exemplary embodiment shown, ethylenediamine provides the amine group AM1 for the reaction.

In one exemplary embodiment, synthesis of AFC material requires an aqueous chitin sodium hydroxide solution made by adding 100 millimoles or mmol (4 grams) of sodium hydroxide (chemical formula NaOH) to 10 milliliters (mL) of water (chemical formula $H_2O$), and stirring at room temperature until the sodium hydroxide has dissolved. Then, the solution requires the stirring of 3.05 mmol (500 milligrams or mg) of chitin (chemical formula $C_{16}H_{28}N_2O_{11}$ ($C_8H_{13}NO_5)_n$) into the aqueous sodium hydroxide solution, until the chitin dissolves. In this exemplary embodiment, stirring for approximately 15 minutes dissolved the chitin in the solution. In this embodiment, the aqueous chitin sodium hydroxide solution is cooled in an ice bath for two hours.

In this embodiment, synthesis of AFC material also requires a chloroform tosyl chloride solution made by dissolving 45.8 mmol (8.7 grams) of tosyl chloride (chemical formula $CH_3C_6H_4SO_2Cl$) in 20 mL of chloroform (chemical formula $CHCl_3$). Next, the chloroform tosyl chloride solution combines with the aqueous chitin sodium hydroxide solution, producing a chitin molecule that may have a tosyl group bound to each N-acetylglucosamine unit in the chitin chain.

In one exemplary embodiment, the chloroform tosyl chloride solution and the aqueous chitin sodium hydroxide solution combine to form a tosyl chitin binding solution. The tosyl chitin binding solution is stirred while it cools in an ice bath. After two hours in the ice bath, this embodiment of the synthesis requires stirring the mixture at room temperature for 2 hours.

Next, this embodiment of the synthesis method allows the tosyl chitin binding solution to separate into a target layer and a hydrophilic waste layer to extract the target layer from the waste layer.

In one exemplary embodiment, the mixture is poured into 100 mL of water ($H_2O$) and allowed to separate into a chloroform layer and an aqueous (water-based) layer. In one exemplary embodiment, the target layer is comprised of chloroform and tosyl chitin, and a hydrophilic layer includes sodium hydroxide, chloride, and water.

In one exemplary embodiment, the step of extracting the target layer is achieved by decanting. In this embodiment, the chloroform layer is poured into a separate container and the aqueous layer is discarded. In one exemplary embodiment, this decanting process where the chloroform layer is added to water and poured into a new container is repeated several times.

In this embodiment, the target layer is filtered to extract a quantity of tosyl chitin. The chloroform in the target layer passes through the filter, then water ($H_2O$) passes through the filter to wash it, then methanol (MeOH) passes through the filter to wash it. The water and methanol wash steps are repeated several times to produce solid tosyl chitin.

In this exemplary embodiment, 1 gram of solid tosyl chitin is added to a DMSO solution containing 40 mL of DMSO, 283 mg of triethylamine, and 1.68 g of ethylenediamine. Ethylenediamine provides the AM1 functional group shown in FIG. 1. This creates a solution with amine groups that are available for binding.

In this exemplary embodiment, the tosyl chitin and available amine group solution is stirred at room temperature to dissolve all solids and may be added to dimethylformamide (DMF) to test whether a water-soluble product exists.

In this exemplary embodiment, the tosyl chitin and available amine group solution is heated until the tosyl groups separate from the chitin molecules and the amine group molecules bind to the chitin molecules to create amine functionalized chitin molecules within the DMSO solution. In one exemplary embodiment, the tosyl chitin and available amine group solution is heated to 70° C. and held at that temperature for 8-16 hours.

In this exemplary embodiment, the DMSO solution is poured into 250 mL of acetone to isolate the amine functionalized chitin molecules in a solid form.

What is claimed is:

1. A munitions compound detection and removal apparatus comprised of:
    a delivery component containing a quantity of amine functionalized chitin (AFC) compound;
        wherein said AFC compound is comprised of a chitin molecule bound to at least one amine group;
    wherein said delivery component is adapted to interface with a water sample; and
    wherein said delivery component includes a viewable interface that displays a color correlated with the presence of a munitions compound.

2. The apparatus of claim 1, wherein said delivery component is adapted to interface with solids suspended in liquid.

3. The apparatus of claim 1, which further includes a removal component for removing munitions compounds from solution.

4. The apparatus of claim 3, wherein said removal component is an apparatus for capturing particles comprised of said AFC compound and said munitions compounds.

5. The apparatus of claim 4, wherein said removal component is a filter.

6. The apparatus of claim 5, wherein said filter has a pore size of 0.45 microns.

7. The apparatus of claim 4, wherein said removal component is a filtration column.

8. The apparatus of claim 1, wherein said AFC compound is further comprised of trace components selected from a group consisting of tosyl molecules and ethylenediamine.

9. The apparatus of claim 1, wherein said AFC compound is a solid that has been formed by evaporating a substance containing dimethyl sulfoxide (DMSO), Tosyl chitin, dimethylformamide (DMF), ethylenediamine, and triethylamine.

10. The apparatus of claim 1, wherein said munitions compound is selected from a group consisting of TNT, DNAN, and NTO.

11. The apparatus of claim 1, wherein said delivery component is selected from a group consisting of the following: a receptacle containing said quantity of AFC compound, and a material infused with said AFC compound.

12. The apparatus of claim 1, wherein said viewable interface may be selected from a group consisting of the following: a substantially transparent container containing said AFC compound, paper to which said AFC compound is applied, fabric to which said AFC compound is applied, and a structure to which said AFC compound is applied.

13. The apparatus of claim 1, wherein the minimum detectable concentration of said munitions compound is 1 ppm.

14. The apparatus of claim 1, wherein the intensity of said color varies with concentration of said munitions compound.

15. The apparatus of claim 1, wherein the intensity of said color may correlate to a scale to visually quantify the concentration of at least one said munitions compound.

16. The apparatus of claim 1, wherein said quantity of AFC compound may be varied to increase sensitivity.

17. The apparatus of claim 1, wherein said viewable interface is configured to turn red when exposed to TNT.

18. The apparatus of claim 1, wherein said viewable interface is configured to turn light yellow when exposed to NTO.

19. The apparatus of claim 1, wherein said viewable interface is configured to turn yellow when exposed to DNAN.

20. The apparatus of claim 1, wherein said viewable interface is configured to turn yellow when exposed to multiple munitions compounds.

* * * * *